United States Patent [19]

Csabai et al.

[11] Patent Number: 5,232,955

[45] Date of Patent: Aug. 3, 1993

[54] PROCESS FOR PRODUCING A HIGH STRENGTH ARTIFICIAL (CAST) STONE WITH HIGH PERMEABILITY AND FILTER EFFECT

[75] Inventors: Tibor Csabai; Miklos Magyar, both of Budapest; Istvan Munkacsi; Mihaly Kun, both of Szoknok; Tibor Plajner; Ambrus Andristyak, both of Budapest; Cecilia Fuzes nee Takacs; Istvan Balazs, both of Budapest, all of Hungary

[73] Assignees: Mol Magyar Olaj Es Gazipari Reszvenytarsasag, Budapest; Koolajkutato Vallalat, Szolnok, both of Hungary

[21] Appl. No.: 808,009

[22] Filed: Dec. 16, 1991

[51] Int. Cl.$^5$ .............................. C08J 9/00; C09K 3/00
[52] U.S. Cl. .................................. 521/63; 252/8.551; 521/92; 521/187; 521/188; 521/88; 521/90
[58] Field of Search ................... 521/187, 188, 79, 92, 521/88, 90; 252/8.551

[56] References Cited

PUBLICATIONS

"Inside Gravel Packing", *Sand Control Handbook 2*, Edition 1985, By G. Suman et al., pp. 42–50.
"Sand—Control Services and Technology", *Composite Catalog of Oil Field Equipment and Services*, 1988–1989, pp. 1164–1666.
"Part 1—When to apply control measures and why proper drilling and completion methods are critically important", Sand Control, World Oil, Nov. 1974, vol. 179, No. 6, By G. Suman, pp. 63–70.
"Part 2—Exclusive three-part report gives valuable data for evaluating and specifying completion fluids that will not damage sensitive wells", *World Oil*, Dec. 1974, vol. 179, No. 7, By G. Suman, pp. 55–62.
"Part 3—How to avoid poorly designed or plugged perforations that impair productivity and prevent effective sand control", *World Oil*, Jan. 1975, vol. 180, No. 1, By G. Suman, Jr., pp. 83–91.
"Part 4—New technology extends use of devices such as screens and gravel packs to problem areas with smaller, hard-to-hold sands", *World Oil*, Feb. 1, 1975, vol. 180, No. 2, By G. Suman, Jr., pp. 33–39.
"Part 5—Inside gravel packing", *World Oil*, Mar. 1975, vol. 180, No. 4, By G. Suman, Jr., pp. 67–76.
"Part 6—Open hole gravel packing", *World Oil*, Apr. 1975, vol. 180, No. 5, By G. Suman, Jr., pp. 75–80.
"Part 7—Consolidating formation sand by chemical methods requires precise application and careful fluid handling", *World Oil*, May 1975, vol. 180, No. 6, By G. Suman, Jr., pp. 75–83.
"Part 8—New testing methods can indicate how basic properties of unconsolidated sands change with type of fluid and applied loads", *World Oil*, Jun. 1975, vol. 180, No. 7, By G. Suman, Jr., pp. 49–52.

*Primary Examiner*—Morton Foelak
*Attorney, Agent, or Firm*—Young & Thompson

[57] ABSTRACT

The invention relates to a process for producing a high-strength a furan stone with high permeability and filtering effect mainly for protecting deep-drilled wells yielding mineral oil, natural gas and water against getting choked by sand. A mixture comprising an artificial resin as a binding material containing a catalyzer for controlling duration of binding and pumpability and an assorted granular material of high-strength forming the skeleton and salt filling and increasing pore spaces is homogenized and pumped into the corresponding producing section of the well into the area to be protected. After hardening of the mixture salt is dissolved from the obtained artificial stone and a filtering effect is achieved without binding the grains of the reservoir rock. Due to the mechanical characteristics and controlled porosity of the obtained artificial stone rock-parts, mainly sand delivered by the yielded fluidum into the well will be retained. An artificial stone with filtering effect can be prepared and hardened on the surface which can be inserted into the well and may be used as a sand-filter or with a desired shape and size it can be used for ecological purposes or in the industry to filter liquids or gaseous media, resp.

5 Claims, No Drawings

PROCESS FOR PRODUCING A HIGH STRENGTH ARTIFICIAL (CAST) STONE WITH HIGH PERMEABILITY AND FILTER EFFECT

The invention relates to a process for producing a high-strength artificial (cast) stone with high permeability, in particular for protecting deep drilled wells yielding mineral oil, natural gas as well as water, against getting shoaled clogged by sand. A filtering ability can be realized by using the process according to the invention, in so far as artificial resin with a proper pumping and binding time having been controlled by means of some catalyzer and graded granular materials forming the skeleton, as well as soluble salts for filling and increasing the porous space are mixed on the surface thereafter the liquid mixture is pumped into the proper section of the producing well into the area to be protected where it hardens; after having dissolved the salts from the solid product, an artificial stone with filter effect is staying at disposal without binding the grains of the storing rock.

Due to the mechanic and controlled porous character of the artificial stone introduced into the area of the well and got hardened therein, solid rock parts, mainly sand delivered to the well by means of the produced fluidum will be retained resp. filtered.

By applying the process according to the invention protection of wells against getting choked or shoaled can be realized.

By using the process according to the invention a filter made of artificial stone can be prepared which hardens on the surface and when built-in shows a different character and can be prepared in the desired shape and size being well suitable for protecting wells against getting shoaled; the properly sized and shaped artificial stone filters liquids and gases for the purpose of ecology and for industrial purposes as well.

Within the scope of activity of the invention, prior art processes show the following characteristics:

In the field of mining mineral oil, natural gas and water, resulting from the peculiarities of operating conditions, rock skeleton of the loose sand of the producing layer, tending to dissolution gets dissolved, as a consequence, the solid materials, mainly sand are entrained by the yielded fluids. Rock grains endanger safe operation of the well, as failures disturbing production of the surfacial equipments may occur. Catastrophal shoaling makes production impossible, the well has to be abandoned. Accordingly, sand is to be retained considerably or completely, shoal of the well must be avoided.

A full description of the methods for protection of wells against getting shoaled is given by G. O. Suman: Sand Controll, (a series of eight parts in World Oil 1974, 6th November 1975, 6th June, 74 W.O. 179 No. 6 pages 63 to 70, no. 7 pages 55 to 62, 75 W.O. 180 No. 1 pages 83 to 91, No. 2 pages 33 to 39, No.4 pages 67 to 76, No.5 pages 75 to 80, No. 6 pages 75 to 83, No. 7 pages 49 to 52. These matters are absolutely valid even nowadays and used as manuals of the relevant industries in the whole world.

One of the most generally used method of protection against getting shoaled lies in the course of which a screen made of woven copper or recently a slit-type screen made of wire is used and built in into the well and to increase efficiency finely graded gravel used to be filled around the filter, e.g. under the condition of the oil industry, graded quartz-sand used to be filled in. Said processes are fairly efficient, however, they require most expensive outfits of the well and complicated operative steps. The most considerable disadvantage of said method lies in that failure of the wells frequently occurs, repair is mostly complicated and expensive. (See: G. O. Suman, R. C. Ellis, R. E. Snyder: Sand Control Handbook 2nd Edition, 1985 pages 42 to 45, Gulf Publishing Company, Houston).

In contrast with the above-mentioned mechanic methods there are known chemical methods as well, e.g. widespread methods used by Dowell Schlumberger Co. which represent the most modern processes (see Composite Catalogue of Oil Field Equipment and Services, issued by the World Oil, a Gulf Publishing Company (Publication 1988-89, pages 1164 to 1166). In the course of the Sandlock "V" process used by said company hardening of the loose rock is realized by injecting sand mixed with epoxy resin into the respective layer. When applying the process "Sand-Consolidation Resin", resin of the type phenol formaldehyde is used for the consolidation of the rock, in the course of which the resin forms a coating around the grains of the storing rock and binds the loose sand therewith.

Considerable economical advantage of the consolidation processes using resins lies in that no expensive mechanic appliances are introduced into the well, operative steps can be shortened and after having removed the hardened artificial resin by drilling, production can be begun easily. Repeated repair of the wells will be faciliated too as complicated operations for the removal of mechanic equipment from the well becomes superfluous.

The above-mentioned chemical processes show, however, the following disadvantageous features:

In all cases permeability of the yielding layer(s) surrounding the producing wells will be considerably reduced, accordingly producing ability/productivity of the well will be less.

Mineral composition of the storing rock, characters of the yield (oil, gas, water, chemical substances) as well as the temperature of the well influence as significantly the efficiency that as a consequence consolidation of the rock cannot be realized at all, and if, in an inferior quality that means that when hardening artificial resin does not harden properly and not in due time or it hardens in the well while being pumped; that means that chemical processes can be controlled with difficulties only.

High clay content of the reserving rock or the quantity of sand having been already gained, resp. formation of cavernae may exclude applicability of the method.

Realization of the above-mentioned methods requires special field-equipment, well trained experts and servicing activity with a special laboratory as a background.

Due to the above-mentioned problems chemical methods of consolidation are superseded by mechanical filtration processes.

The aim of the invention lies in maintaining all the advantages of chemical methods, eliminating all the complicated underground equipments, simultaneously achieving sufficient protection against getting shoaled to be realized by suitable chemical processes. A further aim of the invention lies in that instead of chemical consolidation of the layers to realize a filtering mechanism improving flow conditions in the environment of the well simultaneously enhancing productivity and providing continuous protection against getting shoaled, resp. The new process should be realized economically, with a high safety of operation using less complicated auxiliary equipments and so that rock-physical and geological conditions of the reserving rock and production conditions should minimally restrict application of the process. In addition to the protection against getting shoaled the process should be suitable for solving other problems for instance avoiding caving, filling up cavernae resp. supporting or enforcing covering layers and layer walls.

Our primary aim lies in that the artificial filtering mechanism could be pumped into the producing section of the well and after having been hardened locally it should perform its function. At the same time a further requirement lies in that the solid substance with a filtering character could be prepared under surfacial conditions too, which can be used as a filter to be inserted in a well or for any other industrial purpose for the filtration of liquids and gaseous products.

To solve the task set in accordance with the invention a method is provided for the establishment of an artificial filter of excellent quality made of an artificial stone with the desired permeability in wells, resp. in the perforated tracts thereof, in the direct environment thereof, in the gaps and cavities formed therein, thus realizing the protection against being filled with or clogged by sand. This method is based on the establishment of a filtering effect instead of the consolidation of the layers.

The invention provides a liquid mixture forming the basic material of an artificial stone to be prepared on the surface and said artificial stone can be used for industrial purposes for filtering liquids as gaseous media. In an effort to achieve the above aims, it was found that a high-strength granular material, in particular quartz sand or artificial corundum bound with a furan resin requirements and forms the skeleton or solid structure of the artificial stone, simultaneously controlling the pore size. To promote permeability of the pores, salts expediently water soluble salts, so e.g. common salt (NaCl) are used. After having dissolved the salt from the hardened artificial stone a high-strength material formed with high-porosity and excellent permeability and filtering ability is obtained.

In the course of the process according to the invention a liquid substance is produced which can be well pumped, whereas pumping ability, rheology, time resp. duration of gelation and binding can be controlled in compliance with the actual conditions of the well by using catalyzers or other materials improving rheological characteristics, as well as with solvents and thinners. The properly prepared and homogenized mixture can be punped into the opened section of the well, directly into the spaces around the well, using a technology similar to that of placing a cement plug. After hardening superfluous artificial stone can be drilled out and salt can be dissolved from the pores, thereafter the well provided this way with protection against choked by sand can be put into productive operation.

The process according to the invention provides a highstrength artificial stone with considerable permeability and filtering effect wherein a homogenized mixture with proper rheology is prepared said mixture comprising in suitable a furan resin cross-linked with an acidic catalyzer serving as a binding material and controling the time of hardening and the ability of being pumped a graded granular material and the pore space forming the skeleton, a salt soluble in water or a thin acid for increasing porosity to be dissolved then after hardening by dissolving the salt the artificial stone with filtering effect will be obtained.

In compliance with thermal conditions in the range between 10°-180° C. as well as with the possibilities to implement the operations and to meet the requirements in respect to pumping and hardening as catalyzer for furan resins diluted inorganic acid, expediently phosphorous acid or hydrochloric acid, nitrous acid, sulfuric acid, resp.—in a concentration of 1-10%o and in a quantity of 1 to 5% or related to the mixture, or tartaric acid in a concentration of 5-20% and in a quantity of 1 to 10% related to the mixture or citric acid in a concentration of 10 to 20% and in a quantity of 5 to 10% related to the mixture, resp. can be used.

As a classified and assorted high-strength granular material, forming the skeleton and defining the size of the pores, expediently quartz sand or artificial corundum with a grain size dimensioned in compliance with the filter may be used, the quantity of the granular material corresponds to the actual requirements of the technology. Generally, a quantity essentially equal to the quantity of furane resin is used.

Said soluble salt increasing the pore space may be 5 to 45% or 20 to 30% $CaCO_3$ or 15 to 33% $CaCl_2$ related to the mixture. For the sake of controlling viscosity and gelation of the mixture thus obtained, related to the mass of the mixture 1 to 5% furfuryl alcohol, 0.5 to 1.5% glass pearls and flyash or 0.5 to 1.0% pulverized quartz and active carbon or 1.5 to 3% water can be added.

With the most generally used version of the process according to the invention the liquid mixture having been prepared on the surface is pumped into the corresponding producing section of the well yielding mineral oil, natural gas or water, resp., particularly into the perforations cavernae and fissures of the well area wherein the inner space facing the productive layer of the well will be filled with the mixture, too. After the expiration of binding time the artificial stone is removed by drilling. Thereafter salt is dissolved from the pore space of the artificial stone either with water or in dependence of the type applied and layer conditions with 10% hydrocloric acid containing inhibitor (expediently KL-13 or Armohib 28) under the effect of which permeability and filtering character of the artificial stone can be established. In general, permeability can be set to 5 to 12 Darcy value. In comparison to rocks tending to disintegration this value is higher by one order of magnitude. Permeability of any filter made of artificial stone according to the invention and prepared even under most unfavourable conditions, reaches the value of 1 Darcy. The permeability will be further increased by the flow of the yield, till the total quantity of salt is dissolved.

Compressive strength of the filter made of artificial stone reaches the value 6 to 22 MPa resulting in a high-strength qualitative protection against getting shoaled.

After having realized the process according to the invention as specified above the well being thus provided with protection against clogging as required can be put into operation.

With a second version of the process according to the invention after having mixed all the basic materials the liquid mixture is poured into moulds of proper shape and size while operation is performed on the surface. Following hardening using the above steps an artificial stone with a filtering effect will be obtained. When inserting the artificial stone thus formed and exhibiting a filteringq effect into a well yielding hydrocarbonates or water it can be used as an internal well-filter or for several ecological purposes or in the industry for the filtration of liquids or gaseous media, resp.

Implementation of the process according to the invention will become clear on the basis of the following examples. Said examples reflect the process under various conditions in respect to temperature, rheology and pumping whereby also the application of said different catalyzers, added salts and filling materials, as well as methods for forming the pores by dissolution are illustrated.

EXAMPLES

1) Composition of the mixture hardening at a temperature of 10° C. and under the pressure of 1 bar within 24 hours and which can be pumped for min. 3 hours:

| | |
|---|---|
| 100 g | quartz sand for forming the skeleton or structural matrix |
| 100 g | Salt (NaCl) for forming the pores |
| 100 g | Furane resin as binding material |
| 5 g | Furfuryl alcohol as thinner |
| 30 g | 20% citric acid catalyzer. |

Characteristics of the artifical stone obtained after soaking in water (temperature 30° C.) for 96 hours.

| | |
|---|---|
| Compressive strength | 21.2 MPa |
| Permeability | 5.7 Darcy |

2) Composition of the mixture hardening at 30° C. under a pressure of 80 bar within 24 hours and pumpable for min. 3 hours.

| | |
|---|---|
| 100 g | Salt (CaCl$_2$) for forming the pores |
| 100 g | Quartz sand for forming the matrix structure |
| 100 g | Furan resin as binding material |
| 2 g | Furfuryl alcohol as thinner |
| 10 g | Glass pearls for improving rheology |
| 5 g | Active carbon for improving rheology |
| 2 g | Fly-ash for improving rheology |
| 10 g | 20% citric acid as catalyzer |

Characteristics of the artificial stone thus obtained after having been soaked in 60° C. warm water for 96 hours:

| | |
|---|---|
| Compressive strength | 6.9 MPa |
| Permeability | 4.2 Darcy |

3) Composition of the mixture hardening at 50° C. and under a pressure of 35 bar and pumpable for min. 3 hours:

| | |
|---|---|
| 100 g | Quartz sand for forming the skeleton |
| 100 g | Salt (CaCl$_2$) for forming the pores |
| 110 g | Furan resin as a binding material |
| 5 g | Glass pearls for improving rheology |
| 5 g | Fly-ash for improving rheology |
| 6.5 g | 1 °/$_{oo}$ phosphorous acid as a catalyzer |

Characteristics of the artificial stone thus obtained after having been soaked in 10% hydrocloric acid containing 2°/oo KL-13 inhibitor at 45° C.:

| | |
|---|---|
| Compressive strength | 7.9 MPa |
| Permeability | 11.9 Darcy |

4). Composition of the mixture hardening at 60° C. and under a pressure of 40 bar within 24 hours and pumpable for min. 2 hours:

| | |
|---|---|
| 200 g | Artificial corundum for forming the structure |
| 100 g | Furan resin as a binding material |
| 5 g | Furfuryl alcohol as thinner |
| 5 g | 20% tartaric acid as catalyzer |
| 3 g | Salt (NaCl) for increasing the pore space |

Characteristic of the artificial stone thus obtained after having been soaked in 60° C. warm water for 96 hours:

| | |
|---|---|
| Compressive strength | 8.9 MPa |
| Permeability | 2.2 Darcy |

5) Composition of the mixture hardening at 70° C. and under a pressure of 50 bar and pumpable for min. 2 hours:

| | |
|---|---|
| 100 g | Artificial corundum for forming the skeleton |
| 100 g | Salt (NaCl) for forming the pores |
| 100 g | Furan resin as a binding material |
| 10 g | Furfuryl alcohol as a thinner |
| 8 g | 20% tartaric acid as a catalyzer |

Characteristics of the artificial stone thus obtained after having been soaked in 70° C. warm water for 96 hours:

| | |
|---|---|
| Compressive strength | 11.6 MPa |
| Permeability | 6.8 Darcy |

6. Composition of the mixture hardening at 80° C. and under a pressure of 160 bar within 24 hours and pumpable for min. 3 hours:

| | |
|---|---|
| 100 g | Sand for forming the skeleton |
| 100 g | Salt (NaCl) for forming the pores |
| 100 g | Furan resin as a binding material |
| 2 g | Furfuryl alcohol as a thinner |
| 5 g | Pulverized quartz for improving rheology |
| 2 g | Active carbon for improving rheology |
| 10 g | 10% tartaric acid as a catalyzer |

Characteristics of the artificial stone thus obtained after having been soaked in 70° C. warm water for 96 hours:

| | |
|---|---|
| Compressive strength | 8.2 MPa |
| Permeability | 8.6 Darcy |

7) Composition of the mixture hardening at 120° C. and under a pressure of 150 bar within 24 hours and pumpable under the same conditions for min. 2 hours:

| | |
|---|---|
| 100 g | Pulverized quartz for forming the skeleton |
| 100 g | Salt (CaCO$_3$) for forming the pores |
| 100 g | Furan resin as a binding material |

| | |
|---|---|
| 8 g | Furfuryl alcohol as a thinner |
| 10 g | 5% tartaric acid as a catalyzer |

Characteristics of the artificial stone after having been soaked at 80° C. in 10% hydrochloric acid containing 2°/oo Armohib inhibitor for 96 hours:

| | |
|---|---|
| Compressive strength | 11.8 MPa |
| Permeability | 5.2 Darcy |

8) Composition of the mixture hardening at 180° C. under a pressure of 180 bar within 24 hours and pumpable for min. 2 hours:

| | |
|---|---|
| 100 g | Pulverized quartz for forming the skeleton |
| 100 g | Salt (NaCl) for forming the pores |
| 100 g | Furan resin as a binding material |
| 10 g | Furfuryl alcohol as a thinner |
| 3 g | 1 °/oo phosphoric acid as a catalyzer |
| 7 g | Water slowing the reaction (retarder) |

Characteristics of the artificial stone thus obtained after having been soaked in 70° C. warm water for 96 hours:

| | |
|---|---|
| Compressive strength | 6.2 MPa |
| Permeability | 7.8 Darcy |

Hardening of the artificial stones according to the above examples was performed in an autoclave under water; duration of the period while pumping is still possible was measured in a consistometer filled with oil.

Main advantages of the process according to the invention appear in the realization of the aims set:

a) Due to the size and proportion of the functioning pores the artificial stone-filter reduces flow resistance of the yielded fluid simultaneously productivity of the well can be increased.

b) The tasks solved by the invention cover a wide range of conditions (high temperatures, high pressures).

c) Diverse geological and reservoir conditions of the storing rock do not exclude the use of the invented process.

d) The process according to the invention requires neither special and expensive auxiliary equipments nor special technologies, common and generally used means comply with the requirements set by the implementation.

e) Compared with other protective methods the price of the materials and other costs are less.

f) In the course of implementing the process preconditions relating to ecology and safety of operation can be met in a simple way.

We claim:

1. A process for producing a high artificial stone with high permeability and filtering effect wherein from a homogenized mixture with a predetermined rheology comprising in a predetermined proportion an a furan resin with an added acidic catalyzer for controlling duration of pumping and binding and an assorted high strength granular material as well as salt soluble in water or thin acid dilution for forming pores is prepared, then obtaining said artificial stone by chemical reactive consolidation and subsequent dissolution of said salt by water or thin acidic dilution.

2. The process as claimed in claim 1 wherein as said catalyzer a quantity of 5 to 10% of 1 to 10°/oo phosphoric acid, hydrochloric acid, sulfur acid, nitric acid, or a quantity of 5 to 10% of 5 to 20% tartaric acid, related to the mixture.

3. The process as claimed in claim 1 wherein for the formation of the pore space as said soluble salt, 5 to 40% sodium chloride or 20 to 33% calcium carbonate or 15 to 33% calcium chloride is added.

4. The process as claimed in claim 1 wherein in dependence of the place of hardening, i.e. in the well itself or on the surface said soluble salt for forming the pores is dissolved with water or 10% hydrochloric acid and an artificial stone with a filtering effect will be obtained.

5. A process as claimed in claim 1, wherein furfuryl alcohol is added to said mixture as a thinner.

* * * * *